United States Patent [19]

Hoffman et al.

[11] Patent Number: 4,971,172

[45] Date of Patent: Nov. 20, 1990

[54] TRUCK HOOD ENGINE AIR INDUCTION SYSTEM

[75] Inventors: Lawrence A. Hoffman, Hoagland; James J. Tosconi, Fort Wayne; Steven A. Burke, New Haven, all of Ind.

[73] Assignee: Navistar International Transportation Corp., Chicago, Ill.

[21] Appl. No.: 374,496

[22] Filed: Jun. 30, 1989

[51] Int. Cl.$^5$ .............................................. B60K 13/02
[52] U.S. Cl. ................................. 180/68.3; 180/69.21
[58] Field of Search ................... 180/68.1, 68.2, 68.3, 180/68.6, 69.2, 69.21

[56] References Cited

U.S. PATENT DOCUMENTS 3,232,368  2/1966  Sullivan ................................ 180/69
3,641,746  2/1972  Smith et al. ........................... 55/385

FOREIGN PATENT DOCUMENTS 61-287820  12/1986  Japan ................................ 180/68.3
1346998    2/1974   United Kingdom ............... 180/68.1

Primary Examiner—Charles A. Marmor
Assistant Examiner—Eric Culbreth
Attorney, Agent, or Firm—F. David AuBuchon; Dennis K. Sullivan

[57] ABSTRACT

In a hood for a conventional highway truck, induction air for the engine of the truck is drawn by the engine vacuum into the hood through air inlets therein at the upper corners of the grille opening defined by the front hood reinforcement to avoid the more severe road splash contamination. The air is drawn through several turns of ninety degree or smaller angle, including the inlets disposed perpendicularly to the path of travel, through a vertical duct adjacent the front reinforcement, a horizontal duct adjacent the fenders, a rear vertical duct, and the duct-defining rear reinforcement to a connection with the engine air cleaner. Both of the vertical ducts are provided with small drain holes adjacent their lower ends to permit heavier particles and water to drain therefrom. The ducts have been provided with large cross-sectional areas which, in addition to reducing air flow restriction, provide lower air flow velocity which further enables water and heavier particles to drop out of the air stream.

9 Claims, 2 Drawing Sheets

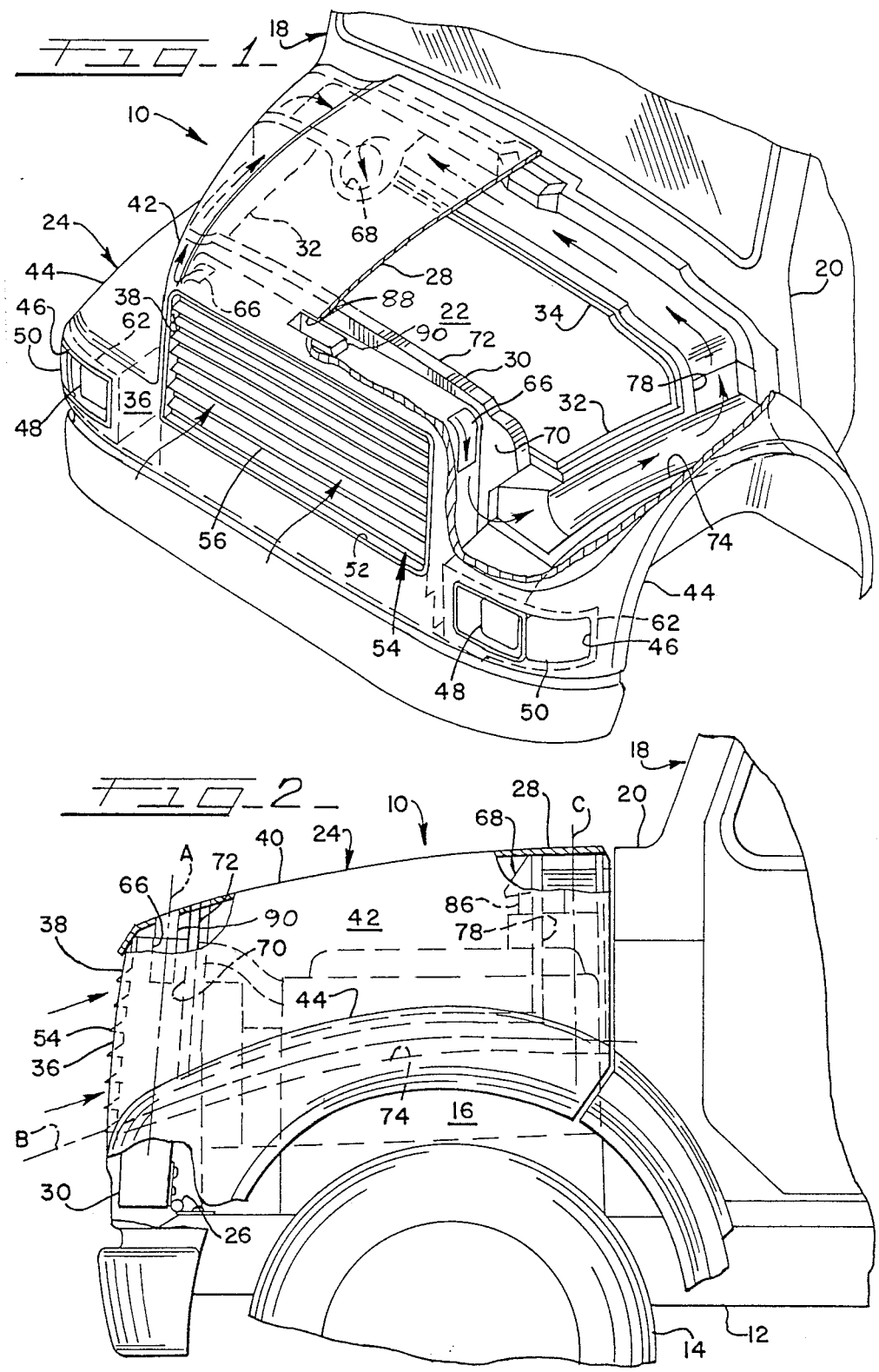

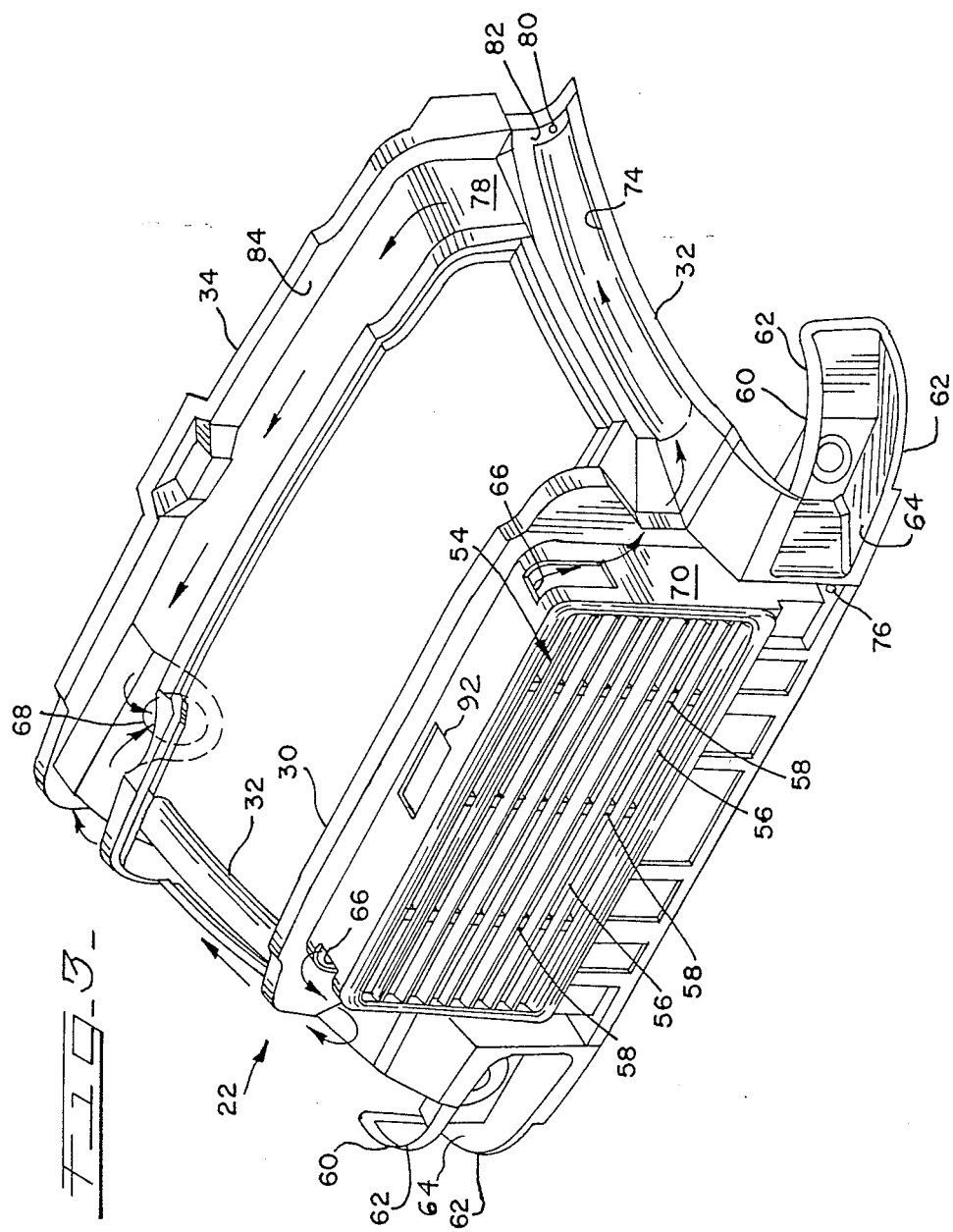

TRUCK HOOD ENGINE AIR INDUCTION SYSTEM

CROSS-REFERENCE TO RELATED APPLICATION

This application is related to U.S. applications Ser. No. 07/374,500 and Ser. No. 374,672, both filed June 30, 1989, and assigned to the assignee hereof.

BACKGROUND OF THE INVENTION

This invention relates to vehicle hoods, particularly truck hoods, of the type which encloses the engine compartment and tilts forwardly away from the truck chassis to expose the engine for service and, more particularly, to an engine air induction system therefor having an extended duct system disposed within said hood to deliver and clean air from the grille area of the hood to the engine.

THE PRIOR ART

It is previously known to provide ducts within a truck hood to deliver air from the vehicle exterior to the engine. U.S. Pat. No. 3,232,368 to Sullivan teaches a molded fiberglass hood having a rear reinforcement beam bonded to the skin which defines a duct opening through the skin at the rear portion of the hood sides. Within the engine compartment, the duct interfaces with the engine air cleaner to draw induction air into the engine.

Although there are commercial vehicles which utilize a hood ducting system similar to that of Sullivan, the external air inlets are typically located on the top or sides of the hood adjacent the rear portion thereof, probably to achieve the shortest passage and, accordingly, the minimum air restriction at the engine. However, these short passage also result in road splash, water, dirt, and other contaminants to be drawn into the hood ducts to be dealt with by the engine air cleaner.

SUMMARY OF THE INVENTION

It is the primary object of the invention described and claimed herein to deliberately provide a much longer ducting system to create a scrubbing effect on the air to remove water and heavier particles therefrom before they reach the engine air cleaner.

In accordance with our invention, the engine air is drawn by the engine vacuum into the hood through air inlets at the upper corners of the grille defined by the front hood reinforcement to avoid the more severe road splash contamination. The air is drawn through several turns of ninety degree or smaller angle, including the inlets disposed perpendicularly to the path of travel, through a vertical duct adjacent the front reinforcement, a horizontal duct adjacent the fenders, a rear vertical duct, and the duct-defining rear reinforcement to a connection with the engine air cleaner. Both of the vertical ducts are provided with small drain holes adjacent their lower ends to permit heavier particles and water to drain therefrom. Although the scrubbing action caused by this labyrinthine ductwork, which is present on both sides of the hood, would appear to increase the air restriction at the engine, the ducts have been provided with large cross-sectional areas. In addition to resolving the restriction problem, the large cross-sections provide for lower air flow velocity which further enables water and heavier particles to drop out of the air stream. An additional advantage is that the extended labyrinthine ducting functions as an inlet air muffler to reduce the exterior noise created by the engine air intake, particularly with naturally aspirated engines.

DESCRIPTION OF THE DRAWINGS

Other objects and advantages of the invention will become more apparent upon perusal of the detailed description thereof and upon inspection of the drawings in which:

FIG. 1 is a front perspective view of a portion of the body of a highway truck incorporating a hood constructed in accordance with the invention, with the hood skin partially cut away;

FIG. 2 is a side view partially cut away of the truck of FIG. 1; and

FIG. 3 is a perspective view of the hood of FIG. 1 with the exterior skin removed.

DESCRIPTION OF THE PREFERRED EMBODIMENT

Referring now to the drawings, there is shown the forward portion of a highway truck 10, including a mobile frame or chassis 12 supported by wheel 14 and driven by engine 16 supported thereon. Mounted on the rearward portion of chassis 12 is an operator's cab partially shown at 18 including a cowl portion 20 which functions as the rear wall of the engine compartment 22 of the truck 10.

A vehicle hood generally designated 24 is mounted to the chassis 12 forward of the cab 18 as by hinge 26, the rear end of the hood abutting against the cowl 20 to enclose the engine compartment 22. As is conventional, the hood 24 is opened to expose the engine 16 by pivoting it about the horizontal pivot axis of hinge 26 so that hood 24 opens forwardly away from the chassis 12. The hood assembly comprises five parts which are bonded together to form a strong integral unit, the five parts comprising the exterior skin 28, the front reinforcement 30, left and right side reinforcements 32, and a rear reinforcement 34, the reinforcements 30, 32, 34 also being bonded to each other at their interfaces to increase the strength of the hood system and to provide a continuous ductwork within the hood 24 as will be seen hereinafter.

The exterior skin 28 is molded to enclose the engine compartment and includes a generally vertical forward wall 36 covering the front face of the hood 24, the forward wall 36 further defining a rectangular ambient air inlet 38 to the engine compartment therein for engine cooling purposes and for engine induction air as will be seen below. The skin 28 further includes a top portion 40 extending back to the cowl 20, the top portion having sidewalls 42 defining the engine compartment which extend downward to blend into fender portions 44 of the hood on both sides which encase the wheels 14 of the truck and extend forwardly to blend into the front wall 36. The fender portions 44 are provided with apertures 46 for receiving one or more lights, such as headlight 48 and turn signal 50.

Disposed adjacently behind the forward wall 36 and bonded to the inner side thereof is the front reinforcement 30. As best seen in FIG. 3, the front reinforcement 30 has several functions not present in previous front reinforcements in addition to its function of providing structural integrity to the forward center part of the hood. The front reinforcement 30 also has a rectangular picture frame opening 52 in register with the ambient air opening 38 in the skin for the passage of ambient air therethrough to the engine compartment 22. However, in our invention, the grille 54 through which ambient air enters is integrally molded as part of the front reinforcement 30 and includes horizontal crossbars 56 and vertical crossbars 58 all integrally joined together in a single molded part. Thus, the integral grille 54 reinforces the picture frame to resist racking loads thereon caused by a front tire hitting a bump.

The front reinforcement 30 is further provided with light housings 60 integrally molded thereinto. The light housings 60 have curved forward framing surfaces 62 defining a recess 64 for receiving and mounting headlight 48 and turn signal 50, the recess 64 being in registry with the light receiving aperture 46 in the exterior skin 28. In the bonding of the front reinforcement 30 to the exterior skin 28, the framing surfaces 62 are bonded to the inside of the skin about the entire periphery of the light apertures 46. This not only provides a light housing completely sealed from the wheel well area but also ties the skin at the fenders to the front reinforcement 30 resulting in greatly increased strength in this area.

As best seen in FIGS. 1 and 3, each of the reinforcements 30, 32, 34 defines, with the exterior skin 28, a portion of an interconnected ductwork for engine air leading on both sides of the hood from engine ambient air inlets 66 in the upper grille area to the air cleaner inlet 68 from the rear reinforcement 34. The engine air inlets 66 are disposed in the front reinforcement 30 at the upper corners of the ambient air inlet to the engine in a manner that the opening lies in a plane parallel to the path of travel. The inlet 66 opens into a generally vertical duct 70 formed between the rear wall 72 of the front reinforcement 30 and the exterior skin 28 of the hood and extends downwardly to an intersection with a duct 74 formed by the side reinforcement 32 and the exterior skin 28. As can be seen from FIG. 2, the angle of the centerline A of duct 70 and the centerline B of duct 74 is less than 90 degrees, thereby forcing the air around a sharp turn to cause entrained water and heavy particles to deposit out due to centrifugal force and also to gravity. As shown in FIG. 3, a drain hole 76 is provided in the bottom of the vertical duct 70 for the water and particles to drop out of the ductwork.

The duct 74 in the side reinforcement 32 extends rearward along the intersection of the hood side wall 42 and the fender 44 to an intersection with rear vertical duct 78 formed between the side portion of the rear reinforcement an the exterior skin. Again, the angle between the centerline B of duct 74 and the centerline C of the rear vertical duct 78 is slightly less than 90 degrees, thereby promoting the scrubbing action of the air. A drain hole 80 is provided in the rear wall 82 of duct 74 adjacent the bottom of the rear vertical duct 78.

The rear vertical duct 78 extends upwardly to an intersection with horizontal duct 84 formed by the top portion of the rear reinforcement 34 and the exterior skin 28 which extends across the inside of the hood to outlet port 68 which is disposed to sealingly engage an air cleaner 86 when the hood is closed in much the same manner as the aforesaid Sullivan patent which is incorporated herein by reference.

At its upper forward corner, the hood 24 is provided with a hand hold which comprises a downturned flange 90 formed around the hand hold opening 88 in the outer skin 24 with the lower edge of the flange 90 being adjacent the aperture 92 in the upper center portion of the front reinforcement 30.

Thus, there has been provided, in accordance with the invention a truck hood engine air induction system which fully satisfies the objects, aims and advantages set forth above. It is recognized that others may develop variations, alternatives and modifications of the invention after a perusal of the foregoing specification. Accordingly, it is intended to cover all such variations, modifications, and alternatives as may fall within the scope of the appended claims.

What is claimed is:

1. In a highway truck having a mobile frame, an engine mounted on said frame, and a hood mounted on said frame and defining a compartment for said engine, said hood including a grille portion forming an ambient air inlet to said compartment transverse of the direction of travel, the improvement comprising an engine air induction passage integrally formed within said hood, said engine air induction passage extending between an engine air inlet aperture opening into said ambient air inlet through said griller portion of said hood, said engine air inlet aperture lying in a plane disposed parallel to the path of travel, and an engine air outlet aperture from said passage disposed on the underside of the rearward portion of said hood and sealingly mated with said engine upon said hood being in a vehicle operating position, said engine air induction passage including a first vertical duct adjacent said grille portion of said hood communication with said engine air inlet aperture, a rearwardly extending horizontal duct communicating with said first vertical duct, a second vertical duct disposed adjacent the rear end of said hood and communicating with said horizontal duct, and a transverse duct communicating with said second vertical duct and extending adjacent the rear end of said hood to said engine air outlet aperture, the intersections of said vertical and horizontal ducts being characterized in that their centerlines are oriented at an angle not greater than 90 degrees.

2. The invention in accordance with claim 1 and open water drain holes disposed in said engine air induction passage adjacent the bottom of both of said vertical ducts.

3. The invention in accordance with claim 1 and said hood having fenders integrally formed therein to define wheel wells, said horizontal ducts of said air induction passage being disposed adjacently above and inside the intersection of said fender and said hood.

4. The invention in accordance with claim 1 and said hood having an engine air induction passage on both sides thereof, the inlet and vertical and horizontal ducts of said passage being symmetrical about the fore-and-aft centerline of said hood.

5. The invention in accordance with claim 1 and said hood having a front reinforcement member bonded thereto and defining said grille portion, said front reinforcement member including said engine air induction passage air inlet aperture.

6. The invention in accordance with claim 1 and said engine air inlet aperture being disposed adjacent the top of said grille ambient air inlet.

7. In a highway truck having a mobile frame an engine mounted on said frame, and a hood having a hood skin mounted on said frame and defining a compartment for said engine, said hood having a forward wall defining an ambient air inlet therethrough to said compartment transverse of the direction of travel, said hood having a plurality of reinforcing members bonded to the interior side of said hood, the improvement comprising an engine air induction passage defined by said reinforcing members, said members being interconnected in substantially air tight relation, said air induction passage extending between an engine air inlet aperture disposed in a front reinforcement of said hood and opening into said ambient air inlet through said forward wall and an engine air outlet aperture from said passage disposed in a rear reinforcement bonded on the underside of the rearward portion of said hood, said engine air outlet aperture being sealingly mated with said engine, said engine air induction passage including a first vertical duct defined between said front reinforcement and said hood skin and communicating with said engine air inlet aperture, a rearwardly extending horizontal duct defined between a side reinforcement and said skin and communicating with said first vertical duct, a second vertical duct adjacent the rear end of said hood defined by a rear reinforcement communicating with said horizontal duct, and a transverse duct defined by said rear reinforcement communicating with said second vertical duct and extending adjacent the rear end of said hood to said engine air outlet aperture.

8. The invention in accordance with claim 7 and said ducts having centerlines, the centerline of said rearwardly extending duct intersecting the centerlines of both vertical ducts at an angle of less than 90 degrees.

9. The invention in accordance with claim 7 and said engine air inlet aperture lying in a plane disposed parallel to the path of travel.

* * * * *